(12) United States Patent
Fernandez

(10) Patent No.: US 11,151,534 B2
(45) Date of Patent: Oct. 19, 2021

(54) CONSUMER INTERACTION MODULE FOR POINT-OF-SALE (POS) SYSTEMS

(71) Applicant: Netclearance Systems, Inc., Escondido, CA (US)

(72) Inventor: David Fernandez, Escondido, CA (US)

(73) Assignee: Netclearance Systems, Inc., Escondido, CA (US)

( * ) Notice: Subject to any disclaimer, the term of this patent is extended or adjusted under 35 U.S.C. 154(b) by 438 days.

(21) Appl. No.: 15/826,504

(22) Filed: Nov. 29, 2017

(65) Prior Publication Data

US 2018/0150819 A1 May 31, 2018

Related U.S. Application Data

(60) Provisional application No. 62/427,327, filed on Nov. 29, 2016.

(51) Int. Cl.
*G06Q 20/20* (2012.01)
*H04W 12/06* (2021.01)
(Continued)

(52) U.S. Cl.
CPC ......... *G06Q 20/202* (2013.01); *G06Q 20/401* (2013.01); *H04L 63/0853* (2013.01);
(Continued)

(58) Field of Classification Search
CPC ... G06Q 20/202; G06Q 20/401; H04W 12/06; H04W 12/08; H04W 4/80; H04W 84/12;
(Continued)

(56) References Cited

U.S. PATENT DOCUMENTS

| | | |
|---|---|---|
| 6,601,039 B1 | 7/2003 | Kolls |
| 6,769,607 B1 | 8/2004 | Pitroda et al. |

(Continued)

FOREIGN PATENT DOCUMENTS

| | | |
|---|---|---|
| EP | 2948833 A4 | 8/2016 |
| WO | 2014117172 A1 | 7/2014 |
| WO | 2018107184 A3 | 8/2018 |

OTHER PUBLICATIONS

Britannica Concise Encyclopedia, Encyclopedia Britannica, 2006, p. 537.

(Continued)

*Primary Examiner* — Garcia Ade
(74) *Attorney, Agent, or Firm* — Genius Patent APC; Bruce Angus Hare

(57) ABSTRACT

An insertable consumer interaction module includes: a terminal interface able to interact with a sales terminal; and a communication module comprising at least one antenna able to interact with a user device. A payment processing system includes: a point of sale (POS) terminal; a consumer interaction module communicatively coupled to the POS terminal; and a server communicatively coupled to the consumer interaction module. An automated method of processing payment requests, the method includes: receiving, at a consumer interaction module, a payment request from a point of sale (POS) terminal; sending the payment request to an authorization server; receiving a response from the authorization server; and sending the response to the POS terminal. The consumer interaction module may be able to interact with various mobile device applications. The module may facilitate payment processing, administration of loyalty programs, advertising, and micro positioning.

11 Claims, 6 Drawing Sheets

(51) Int. Cl.
*H04L 29/06* (2006.01)
*G06Q 20/40* (2012.01)
*H04W 12/08* (2021.01)
*G06Q 30/06* (2012.01)
*H04W 84/12* (2009.01)
*H04W 4/80* (2018.01)

(52) U.S. Cl.
CPC ........... *H04L 63/102* (2013.01); *H04W 12/06* (2013.01); *H04W 12/08* (2013.01); *H04L 2463/102* (2013.01); *H04W 4/80* (2018.02); *H04W 84/12* (2013.01)

(58) Field of Classification Search
CPC .............. H04L 63/102; H04L 63/0853; H04L 2463/102
USPC ......................................................... 705/21
See application file for complete search history.

(56) References Cited

U.S. PATENT DOCUMENTS

| | | |
|---|---|---|
| 6,776,334 B1 | 8/2004 | Garg |
| 6,907,238 B2 | 6/2005 | Leung |
| 7,848,765 B2 | 12/2010 | Phillips et al. |
| 7,907,571 B2 | 3/2011 | Raghothaman et al. |
| 7,936,736 B2 | 5/2011 | Proctor, Jr. et al. |
| 8,082,187 B2 | 12/2011 | Abhari et al. |
| 8,116,749 B2 | 2/2012 | Proctor, Jr. et al. |
| 8,135,624 B1 | 3/2012 | Ramalingam et al. |
| 8,279,067 B2 | 10/2012 | Berger et al. |
| 8,484,076 B2 | 7/2013 | Roberts et al. |
| 8,489,112 B2 | 7/2013 | Roeding et al. |
| 8,583,475 B2 | 11/2013 | Wills |
| 9,159,066 B2 | 10/2015 | Roeding et al. |
| 9,219,979 B2 | 12/2015 | Moldavsky et al. |
| 9,491,584 B1 | 11/2016 | Mendelson |
| 9,811,846 B2 | 11/2017 | Fernandez |
| 9,928,536 B2 | 3/2018 | Fernandez |
| 9,933,265 B2 | 4/2018 | Fernandez |
| 10,586,251 B2 | 3/2020 | Fernandez |
| 2002/0065680 A1 | 5/2002 | Kojima et al. |
| 2002/0095333 A1 | 7/2002 | Jokinen et al. |
| 2003/0137968 A1 | 7/2003 | Lareau et al. |
| 2004/0026503 A1 | 2/2004 | Gantz |
| 2004/0203566 A1 | 10/2004 | Leung |
| 2006/0031126 A1* | 2/2006 | Ma ..................... G06Q 30/0601 705/26.1 |
| 2006/0287813 A1 | 12/2006 | Quigley |
| 2006/0293968 A1 | 12/2006 | Brice et al. |
| 2007/0018820 A1 | 1/2007 | Chand et al. |
| 2007/0030824 A1 | 2/2007 | Ribaudo et al. |
| 2007/0067200 A1 | 3/2007 | Patel |
| 2007/0241184 A1 | 10/2007 | Lum |
| 2007/0254674 A1 | 11/2007 | Pedigo et al. |
| 2007/0268138 A1 | 11/2007 | Chung et al. |
| 2008/0040219 A1 | 2/2008 | Kim et al. |
| 2008/0091541 A1 | 4/2008 | Law et al. |
| 2008/0109317 A1 | 5/2008 | Singh |
| 2008/0214151 A1 | 9/2008 | Ramer et al. |
| 2009/0222358 A1 | 9/2009 | Bednarek |
| 2009/0224909 A1 | 9/2009 | Derrick et al. |
| 2009/0281852 A1 | 11/2009 | Abhari et al. |
| 2009/0322510 A1 | 12/2009 | Berger et al. |
| 2010/0036772 A1 | 2/2010 | Arceneaux et al. |
| 2010/0161433 A1 | 6/2010 | White |
| 2010/0185504 A1 | 7/2010 | Rajan et al. |
| 2010/0245588 A1 | 9/2010 | Waehner et al. |
| 2011/0028093 A1 | 2/2011 | Patel et al. |
| 2011/0028160 A1 | 2/2011 | Roeding et al. |
| 2011/0029362 A1 | 2/2011 | Roeding et al. |
| 2011/0029364 A1 | 2/2011 | Roeding et al. |
| 2011/0178863 A1 | 7/2011 | Daigle |
| 2011/0179064 A1 | 7/2011 | Russo |
| 2011/0191438 A1 | 8/2011 | Huibers et al. |
| 2011/0238476 A1 | 9/2011 | Carr et al. |
| 2011/0276385 A1 | 11/2011 | Keller |
| 2011/0276419 A1 | 11/2011 | Johnson et al. |
| 2011/0302017 A1 | 12/2011 | Marti et al. |
| 2012/0047011 A1 | 2/2012 | Rippetoe et al. |
| 2012/0084210 A1 | 4/2012 | Farahmand |
| 2012/0089460 A1 | 4/2012 | Abhari et al. |
| 2012/0116861 A1 | 5/2012 | Dobyns |
| 2012/0191376 A1 | 7/2012 | Soles et al. |
| 2012/0315839 A1 | 12/2012 | Mumcuoglu et al. |
| 2012/0329132 A1 | 12/2012 | Bloom et al. |
| 2013/0030875 A1 | 1/2013 | Lee et al. |
| 2013/0058796 A1 | 3/2013 | Gerz et al. |
| 2013/0144731 A1 | 6/2013 | Baldwin et al. |
| 2013/0210461 A1 | 8/2013 | Moldavsky et al. |
| 2013/0268353 A1 | 10/2013 | Zeto et al. |
| 2013/0275198 A1 | 10/2013 | Zeto et al. |
| 2013/0275641 A1 | 10/2013 | Tsai et al. |
| 2013/0297422 A1 | 11/2013 | Hunter et al. |
| 2014/0040014 A1* | 2/2014 | Anand .................. G06Q 30/06 705/14.45 |
| 2014/0087752 A1 | 3/2014 | Zhu et al. |
| 2014/0143060 A1 | 5/2014 | Fernandez |
| 2014/0188658 A1 | 7/2014 | Li et al. |
| 2015/0206096 A1 | 7/2015 | Fernandez |
| 2015/0206129 A1 | 7/2015 | Lafuente et al. |
| 2015/0248666 A1* | 9/2015 | Williams ............... G06Q 20/32 705/21 |
| 2016/0005020 A1* | 1/2016 | Fernando ................ G06F 3/048 705/21 |
| 2016/0012422 A1* | 1/2016 | Chitilian ............ G06Q 20/3674 705/67 |
| 2016/0024220 A1* | 1/2016 | Montero Casimiro ...................... A61P 37/06 424/85.1 |
| 2017/0178104 A1 | 6/2017 | Fernandez |
| 2017/0195339 A1* | 7/2017 | Brown .................... G06F 21/34 |
| 2017/0223579 A1 | 8/2017 | Lee et al. |
| 2018/0150819 A1 | 5/2018 | Fernandez |
| 2019/0158353 A1* | 5/2019 | Johnson .............. H04L 61/2514 |
| 2020/0065808 A1 | 2/2020 | Fernandez |

OTHER PUBLICATIONS

Cognition—From Memory to Creativity, Weisberg, Reeves, 2013, John Wiley & Sons, pp. 13-40, 519-527.
Computing the Mind, Shimon Edelman, Oxford University Press, 2008, pp. 26-31.
Creativity and Artificial Intelligence, Francisco Camara Pereira, Mouton de Gruyter, 2007, pp. 51-62.
Explaining Creativity, Keith Sawyer, 2006, Oxford University Press, pp. 104-105.
Ferrari, Wireless sensor networks: Performance and analysis in indoor scenarios, 2007.
Language and Mind, Chomsky, Oxford University Press, 2005, p. 62.
Mental Spaces, Gilles Fauconnier, Cambridge University Press, 1998, pp. xxviii-xxix.
Microsoft Computer Dictionary, Fifth Edition, 2002, Microsoft Press, p. 23.
Mind—A Brief Introduction, John R. Searle, 2004, Oxford University Press, pp. 62-67.
Noetics, Lawrence Krader, 2010, Peter Lang Publishing, pp. 551-553.
Oliveria, Wireless Sensor Networks: A Survey on Environmental Monitoring.
Robotics, Science and Systems III, Wolfram Burgard, Oliver Brock, and Cyrill Stachniss, The MIT Press, 2008, pp. 41-48.
Sen, Dipankar, Prosenjit Sen, and Anand M. Das, RFID for energy & utility industries, 2009, Tulsa, Okla: PennWell, pp. 12-14 (Year: 2009).
The Way We Think, Fauconnier, 2010, Persues Books Group, Chapter 1, Chapter 13.

(56) References Cited

OTHER PUBLICATIONS

What is Thought, Eric Baum, The MIT Press, 2004, pp. 33-65.

* cited by examiner

CONSUMER INTERACTION MODULE FOR POINT-OF-SALE (POS) SYSTEMS

CROSS-REFERENCE TO RELATED APPLICATIONS

This application claims priority to U.S. Provisional Patent Application Ser. No. 62/427,327, filed on Nov. 29, 2016.

BACKGROUND

User devices such as smartphones, tablets, wearable devices, etc. are ubiquitous in society. Many users of such devices may want to use the devices to process purchases, including purchases made via a point-of-sale (POS) system or device.

Such POS devices may not include up-to-date communication features that allow for interactions with the user devices. In order to provide such features, merchants must typically purchase a new POS device at considerable expense.

Therefore there exists a need for a device that is able to provide advanced communication capabilities to existing POS devices.

SUMMARY

Some embodiments may provide a consumer interaction module that may be able to interact with a point of sale (POS) terminal. The module may be a stand-alone device that is implemented using a standard packaging. For instance, some embodiments may be housed in a package that is able to fit a subscriber identity module (SIM), secure access module (SAM) card slot, MicroSD slot, universal serial bus (USB) socket, etc.

Such a package may be fully or partially "insertable" into an existing slot or receptacle associated with the POS terminal. Throughout the present disclosure, the term "insertable" may refer to such packages that are able to fit at least a portion of the housing or package within an existing receptacle (and utilize various resources associated with the receptacle). Thus, for instance, the module of some embodiments may include connectors that are able to supply power to the module, enable communication with the associated terminal, and/or otherwise interact with the terminal (and/or other devices).

The consumer interaction module may include elements such as a controller, memory, and various communication features. Such communication features may include, for instance, wireless transmitters and/or receivers, antennas, interfaces, etc. Such features may enable, for instance, wireless communication capabilities (e.g., Wi-Fi, Bluetooth, etc.) that are not available to the terminal itself.

The communication features may allow the consumer interaction module to communicate with the terminal via physical connectors associated with the slot or receptacle. In addition, the communication features may allow wireless communication among the consumer interaction module, terminal, user devices, servers, and/or other appropriate components. The communication features may allow interactions with various user device applications.

The consumer interaction module may allow for various usage scenarios among the terminal, user device(s), and server(s). For instance, the consumer interaction module may facilitate payment processing by receiving a payment request from the terminal, delivering the request to a user device, receiving payment authorization from the user device, and verifying the transaction with the server. In addition to payment processing, the consumer interaction module may allow administration of rewards or loyalty programs, advertising, and micro positioning (determining locations of user devices relative to the module).

The preceding Summary is intended to serve as a brief introduction to various features of some exemplary embodiments. Other embodiments may be implemented in other specific forms without departing from the scope of the disclosure.

BRIEF DESCRIPTION OF THE SEVERAL VIEWS OF THE DRAWINGS

The exemplary features of the disclosure are set forth in the appended claims. However, for purpose of explanation, several embodiments are illustrated in the following drawings.

DETAILED DESCRIPTION

The following detailed description describes currently contemplated modes of carrying out exemplary embodiments. The description is not to be taken in a limiting sense, but is made merely for the purpose of illustrating the general principles of some embodiments, as the scope of the disclosure is best defined by the appended claims.

Various features are described below that can each be used independently of one another or in combination with other features. Broadly, some embodiments generally provide a consumer interaction module that allows proximity-based interactions at a variety of sales terminals with a variety of user devices.

A first exemplary embodiment provides an insertable consumer interaction module comprising: a terminal interface able to interact with a sales terminal; and a communication module comprising at least one antenna able to interact with a user device.

A second exemplary embodiment provides a payment processing system comprising: a point of sale (POS) terminal; a consumer interaction module communicatively coupled to the POS terminal; and a server communicatively coupled to the consumer interaction module.

A third exemplary embodiment provides an automated method of processing payment requests, the method comprising: receiving, at a consumer interaction module, a payment request from a point of sale (POS) terminal; sending the payment request to an authorization server;

receiving a response from the authorization server; and sending the response to the POS terminal.

Several more detailed embodiments are described in the sections below. Section I provides a description of a hardware architecture of some embodiments. Section II then describes methods of operation of some embodiments. Lastly, Section III describes a computer system which implements some of the embodiments.

I. Hardware Architecture

Figure 1:
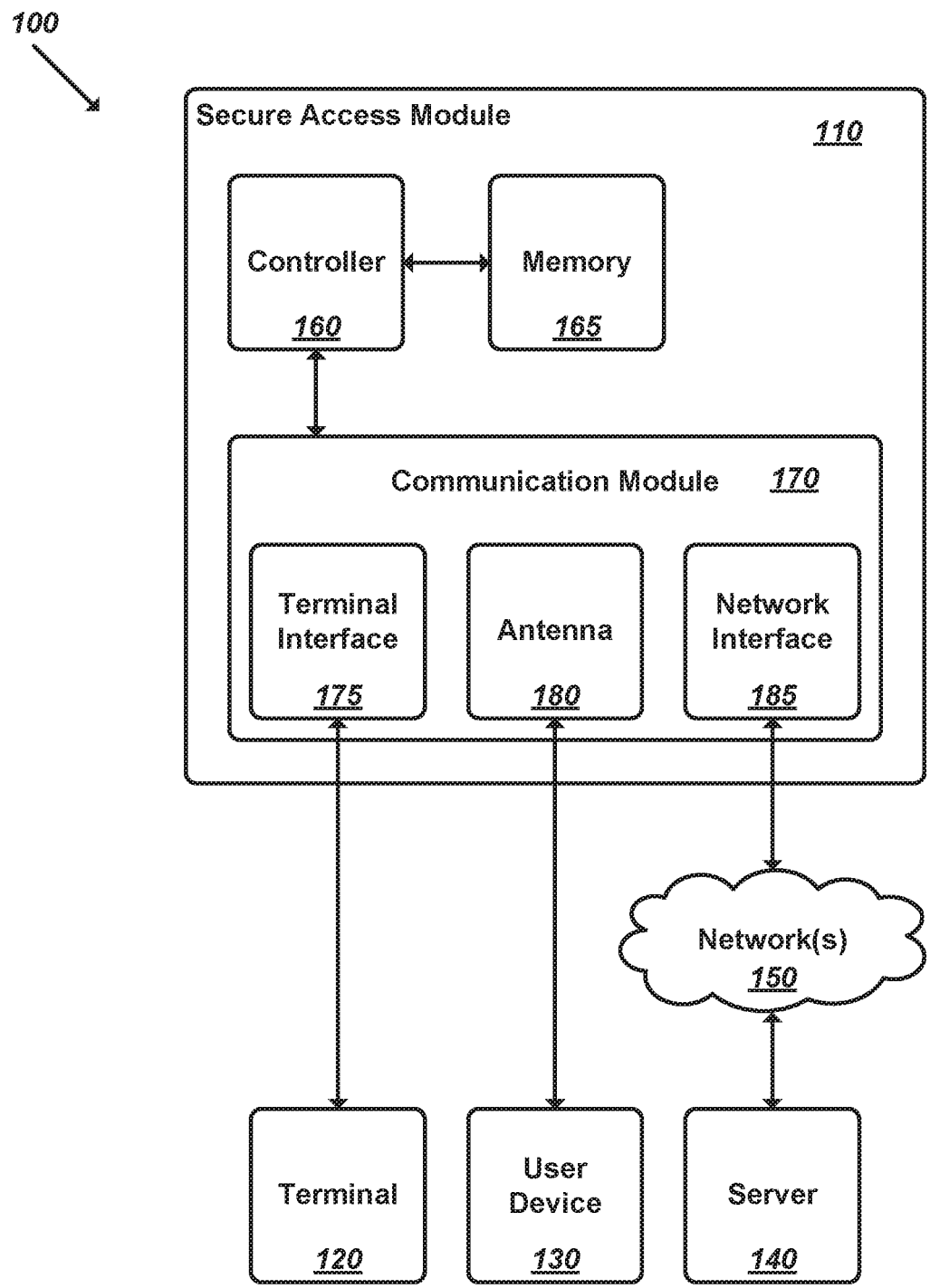
FIG. 1 illustrates a schematic block diagram of a system including a consumer interaction module according to an exemplary embodiment.

FIG. 1 illustrates a schematic block diagram of a system 100 including a consumer interaction module 110 according to an exemplary embodiment. As shown, the system may include the secure access module (or consumer interaction module) 110, terminal(s) 120, user device(s) 130, server(s) 140, and a set of accessible networks 150.

The consumer interaction module 110 may be an electronic device and may include a controller 160, memory 165, and a communication module 170 that may include a terminal interface 175, an antenna 180, and a network interface 185.

The controller 160 may include electronic circuitry and/or discrete devices (e.g., microprocessors, digital signal processors, application specific integrated circuits, etc.) that are able to execute instructions and/or manipulate data such that the controller is able to direct the operations of the various other elements of module 110, as needed.

The memory 165 may include circuitry and/or devices that are able to receive, store, and/or provide instructions and/or data from/to the controller 160 and/or other elements of the module 110, as needed. At least some portion of the memory 165 may include cryptographic memory that is able to facilitate secure interactions with the terminal 120, user device 130, server 140, and/or other devices or systems.

The communication module 170 may allow the consumer interaction module 110 to communicate with various other components, such as the terminal 120, user device 130, server 140, etc. One of ordinary skill in the art will recognize that various alternative communication pathways may be used than shown. For instance, the module 170 may utilize the network interface 185 to communicate with a user device 130 across one or more networks 150. As another example, some embodiments may communicate with the terminal 120 using an antenna 180 and/or network interface 185.

The terminal interface 175 may include various connections between the module 110 and the terminal 120. Such connections may include physical elements such as contact pads on the surface of a SIM card type module 110, pins that extend from a microSD card type module 110, etc. Such types of connections may be referred to as "physical" connections, and may include, for instance, wired connections, terminal or pad connections, etc. The terminal interface 175 may allow for two-way communication between the module 110 and the terminal 120. Such communication may include, for instance, information related to a transaction, rewards program, payment request and confirmation, etc.

The antenna 180 may allow communication across various appropriate wireless pathways (e.g., Bluetooth, WiFi, RF, etc.). The antenna may include one or more "bends" (e.g., a right angle bend) that allow the antenna to fit within the associated footprint and still provide wireless capabilities that meet the appropriate standards. The antenna may be implemented using various appropriate physical elements (e.g., a trace on a printed circuit board, a section of formed metal, etc.). In addition, the antenna may be associated with various transmitters, receivers, etc. that may generate signals for transmission via the antenna and/or receive transmitted signals via the antenna.

The network interface 185 may allow the module to communicate across one or more networks 150. In some embodiments, the network interface 185 may utilize one or more antennas 180 or other communication pathways to access the networks 150. Some embodiments may provide network connectivity to the interface 185 via the terminal 120 and associated terminal interface 175. Likewise, some embodiments may provide network connectivity via the antenna 180 and an associated user device 130 (in such arrangements, the user device may be connected to the module 110 via a physical interface such as a cable rather than via the antenna 180).

The terminal 120 may be an electronic device such as a cash register, credit card terminal, smartphone, tablet, personal computer, parking meter, vending machine, etc. Such devices may include existing SIM card, microSD card, and/or other appropriate slots or ports that may be utilized to accept the consumer interaction module 110 of some embodiments.

The user device 130 may be an electronic device such as a smartphone, tablet, personal computer, wearable device, etc. that is able to communicate with the module 110. Such a device 130 may server as the terminal 120 in some embodiments. In some embodiments, the device 130 may also provide network connectivity to the module 110.

The server 140 may include one or more electronic devices that are able to execute instructions and/or process data. Such servers may be associated with, for instance, payment processing resources, merchant databases (e.g., rewards databases), advertising databases or resources, etc.

The networks 150 may include various appropriate communication pathways, such as WiFi networks, distributed networks such as the Internet, local area wired networks, cellular networks, etc.

Figure 2A:
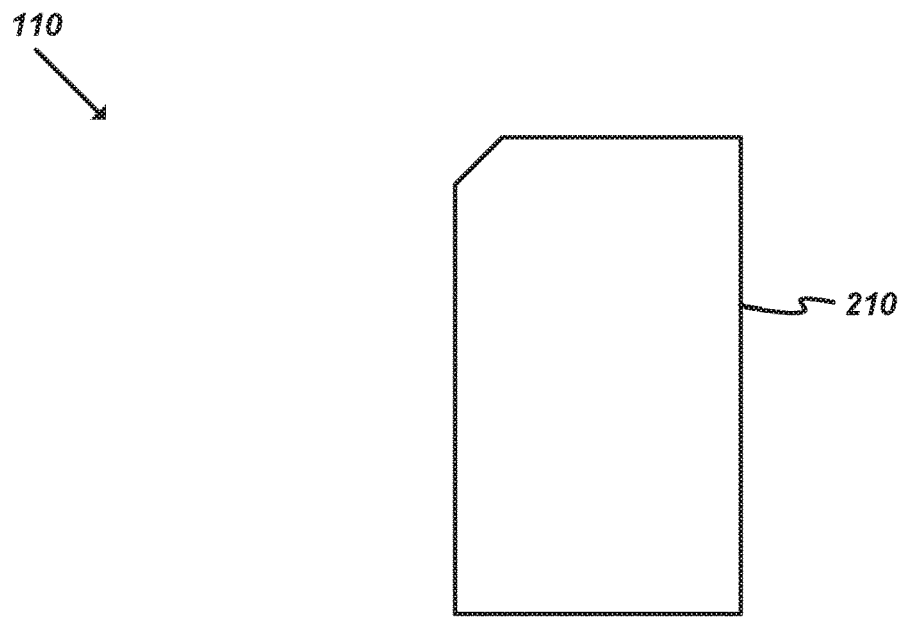
FIG. 2A illustrates a front elevation view of an exemplary consumer interaction module of some embodiments.
Figure 2B:
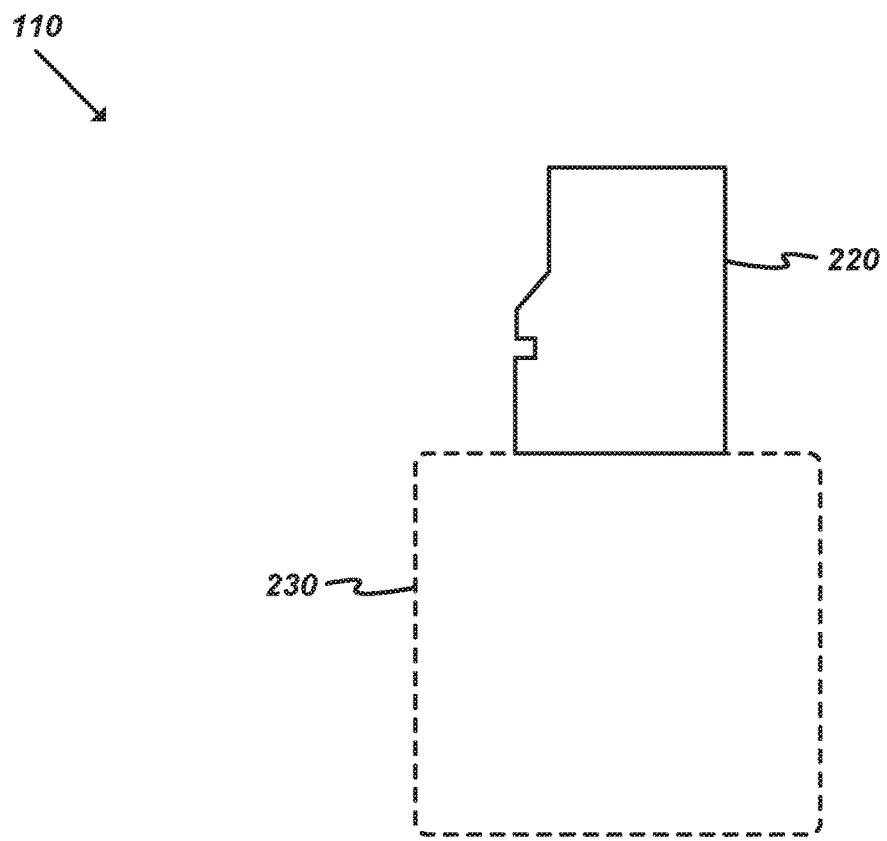
FIG. 2B illustrates a front elevation view of another exemplary consumer interaction module of some embodiments.

FIG. 2A illustrates a front elevation view of an exemplary consumer interaction module 110. As shown, the module is implemented such that the footprint 210 or form factor of the device matches a SIM (or SAM) card footprint or form factor. Thus, the various contact locations of the SIM card may be utilized to allow communication with a terminal or user device. In addition, the entire module may be sized such that the module is able to be placed into an existing SIM slot. FIG. 2B illustrates a front elevation view of another exemplary consumer interaction module 110. As shown, the module is implemented such that the footprint of the device matches the dimensions of a standard microSD card. In this example, the module includes a portion 220 that firs within the microSD slot as well as a portion 230 that does not fit within the microSD card footprint, as indicated by the dashed lines. Some embodiments be arranged such that the module is able to be fully inserted into a microSD slot.

Such devices may be able to be utilized in (and/or with) various existing systems and/or devices, such as registers, credit card terminals, smartphones, tablets, personal computers, parking meters, etc.

One of ordinary skill in the art will recognize that various other specific footprints or form factors may be utilized (e.g., standard secure digital (SD) cards, miniSD cards, compact flash, memory stick, etc.). Each form factor may be at least partially insertable into an appropriate slot. The various components described in reference to module 110 may be included in various other footprints to provide similar functionality to devices with different types or sizes of insertion slots.

II. Methods of Operation

Figure 3:
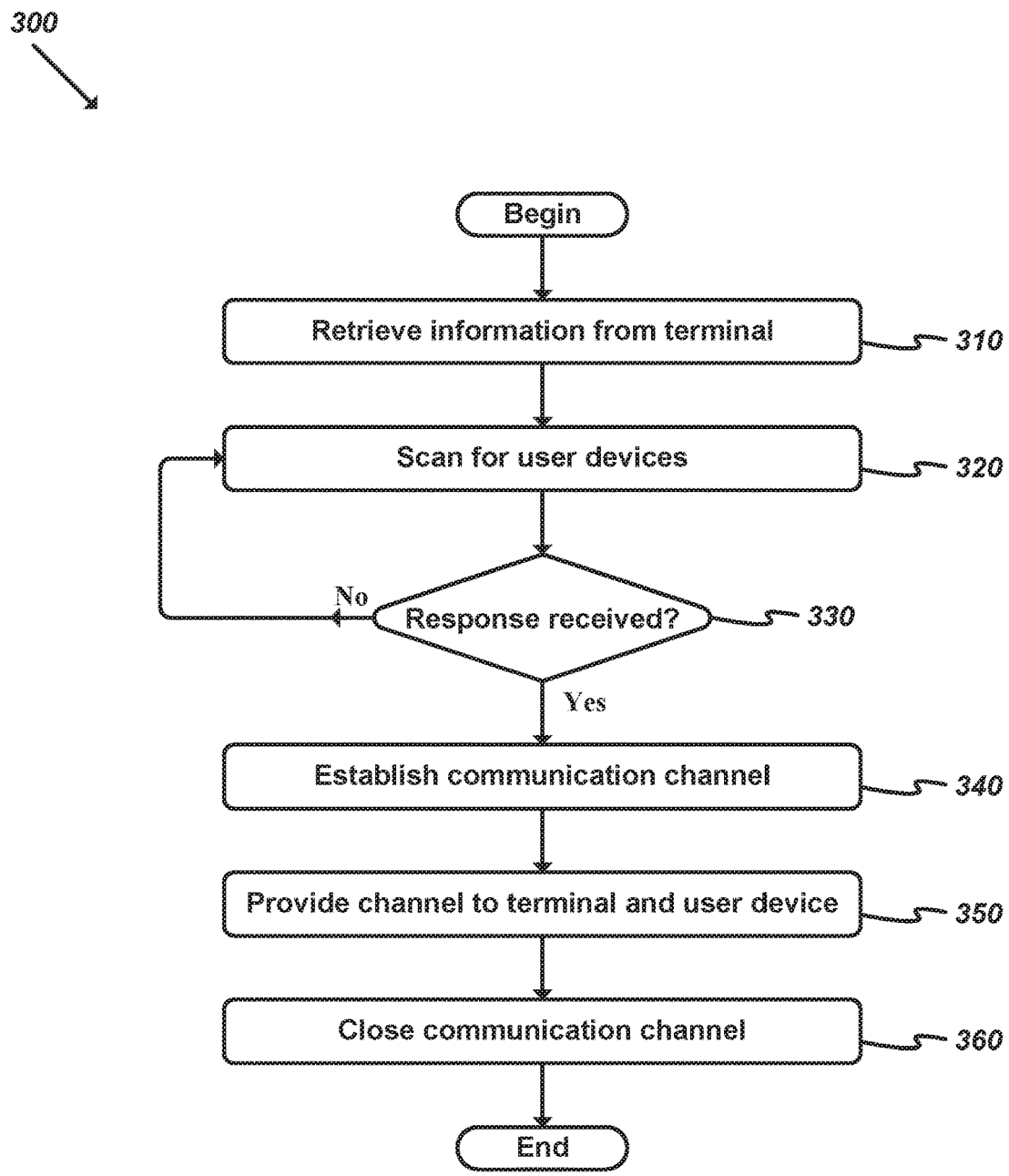
FIG. 3 illustrates a flow chart of an exemplary process that performs proximate consumer interactions.

FIG. 3 illustrates a flow chart of an exemplary process 300 that performs proximate consumer interactions. Such a process may be executed by a device such as module 110 described above. The process may begin when such a module (and/or associated terminal) is powered on.

As shown, the process may retrieve (at 310) information from the terminal. Such information may include, for instance, sales information such as amounts or quantities, item codes, rewards, etc.

Next, the process may scan (at 320) for nearby user devices. Such scanning may including sending a beacon signal, discovery message, and/or other appropriate actions. If no response is received, the process may continue scanning or may end.

If the process determines (at 330) that a response has been received, the process may then establish (at 340) a communication channel with the user device. Such a channel may include a wireless communication channel such as Bluetooth. The channel may be implemented in various appropriate ways and/or using various appropriate resources (e.g., a web browser running on a user device, a dedicated application running on a user device, etc.).

The process may then provide (at 350) the channel to the terminal and user device. Such provision may include, for instance, passing messages back and forth between the terminal and user device, translating messages, parsing message content, generating messages, interpreting messages, fragmenting messages, etc.

Next, the process may close (at 360) the communication channel and then may end. Such termination may be based on receipt of a termination or completion message received from the user device and/or terminal.

Figure 4:
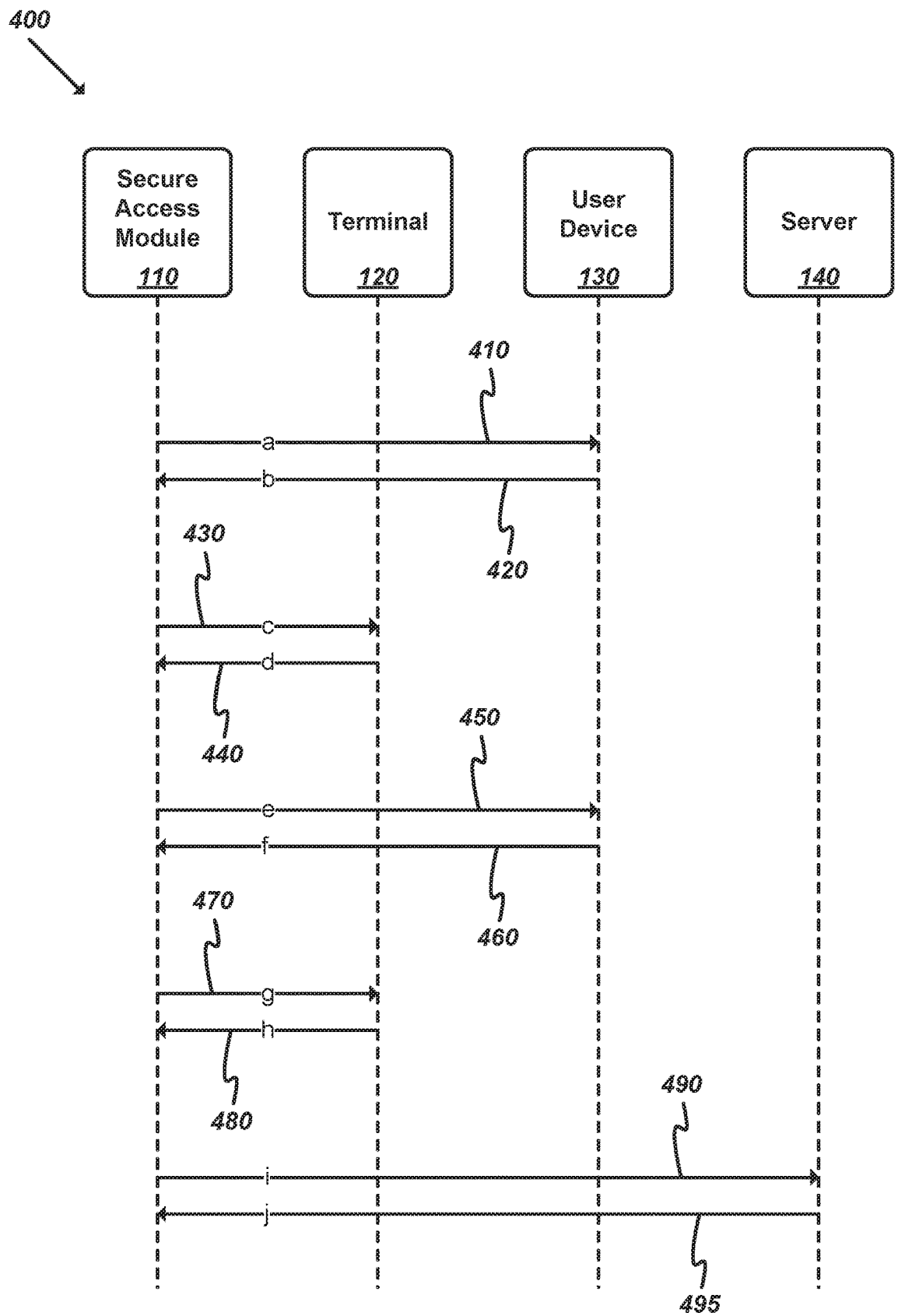
FIG. 4 illustrates a message flow diagram of an exemplary communication arrangement that performs proximate consumer interactions.

FIG. 4 illustrates a message flow diagram 400 of an exemplary communication arrangement that performs proximate consumer interactions. Such message flow may be associated with a process such as process 300 described above.

As shown, the secure access module 110 may send (at 410) a message (a) to a user device 130, which may, in turn, send (at 420) a reply (b). Message (a) may include information related to the module, associated terminal, and/or other appropriate information. The response (b) may include information related to the user device 130, the associated user, and/or other appropriate information. Such messaging may be used to establish a communication channel (e.g., a Bluetooth link) between the module 110 and the user device 130. In some embodiments, the module 110 and/or user device 130 may send additional messages.

Next, the secure access module 110 may send (at 430) a message (c) to a terminal 120, which may, in turn, send (at 440) reply (d). Message (c) may include information related to the user, user device, and/or other appropriate information. The response (d) may include information related to the user (e.g., rewards account information), transaction (e.g., sales amount, list of items, etc.), and/or other appropriate information. Such messaging may be performed using existing connectors of the terminal 120 associated with, for instance, a SIM card or microSD card slot as described above.

The secure access module 110 may then send (at 450) a message (e) to a user device 130, which may, in turn, send (at 460) reply (f). Message (e) may include information related to a transaction, rewards account, and/or other appropriate information. The response (f) may include payment authorization, user identity information, and/or other appropriate information. In some embodiments, the module 110 and/or user device 130 may send additional messages.

Next, the secure access module 110 may send (at 470) a message (g) to terminal 120, which may, in turn, send (at 480) reply (h). Message (g) may include information related to payment authorization, user identity information, and/or other appropriate information. The response (h) may include receipt confirmation, current balance, and/or other appropriate information.

Finally, the secure access module 110 may send (at 490) a message (i) to a server 140, which may, in turn, send (at 495) reply (j). Message (i) may include information related to the transaction, terminal (and/or associated venue), user, and/or other appropriate information. The response (j) may include information related to the user, receipt confirmation, and/or other appropriate information. Such messaging may be used to establish a communication channel (e.g., using an API and one or more networks) between the module 110 and the server 140. In some embodiments, the module 110 and/or server 140 may send additional messages. For instance, in some embodiments, the module 110 may request authorization from a payment processing server 140 before finalizing a transaction.

One of ordinary skill in the art will recognize that process 300 and message flow 400 may be implemented in various different ways without departing from the scope of the disclosure. For instance, different embodiments may perform the operations in a different order, may include additional operations, may omit listed operations, etc. In addition, various operations may be performed iteratively and/or based on various criteria.

Figure 5:
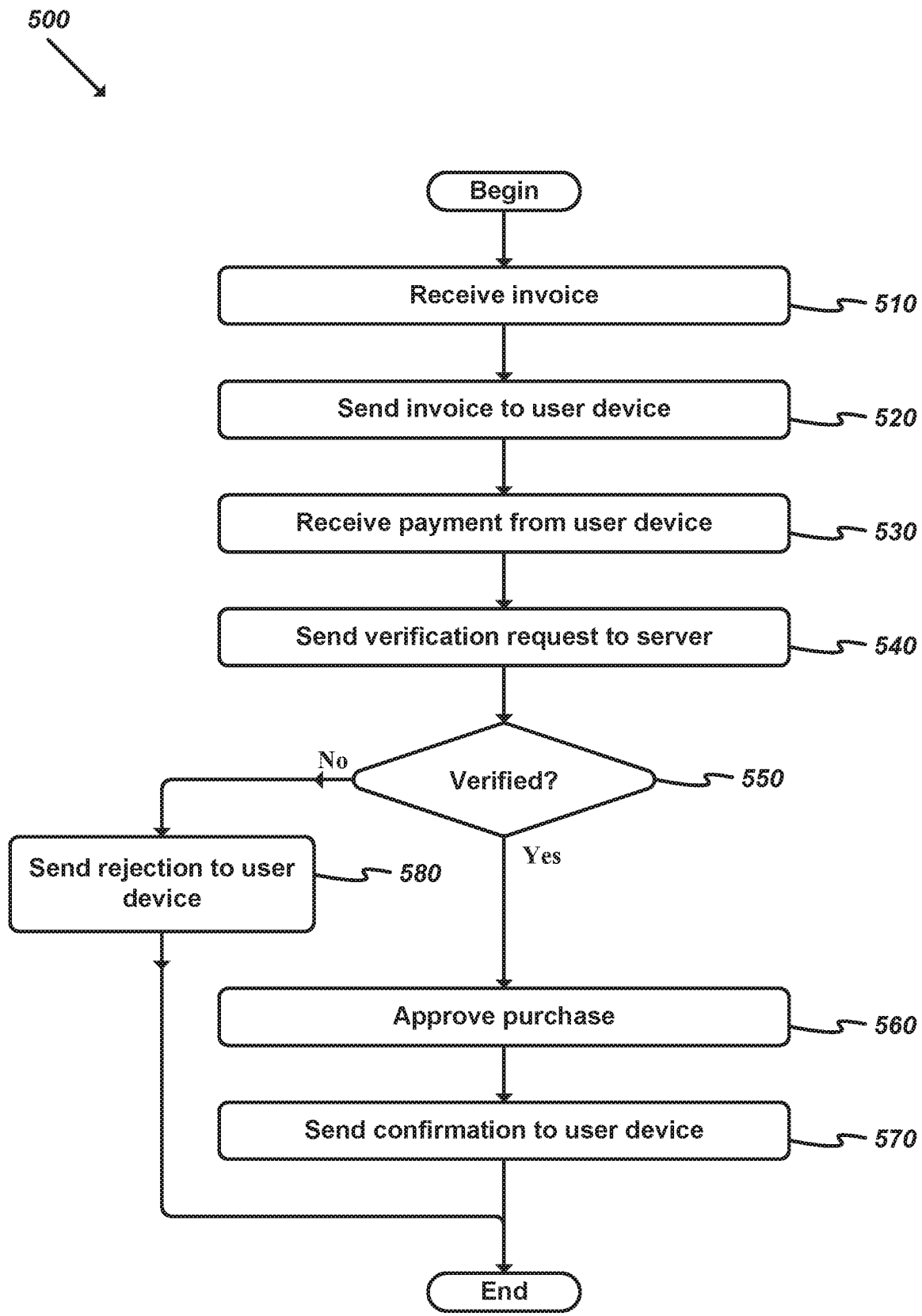
FIG. 5 illustrates a flow chart of an exemplary process that processes a payment from a user device.

FIG. 5 illustrates a flow chart of an exemplary process 500 that processes a payment from a user device. Such a process may be executed by a device such as module 110 described above. The process may begin when such a module (and/or associated terminal) is powered on. In this example, a consumer interaction includes an invoice and payment processing. Different embodiments may be implemented in different specific ways depending on the type of interaction, type of terminal, and/or other relevant factors.

As shown, the process may receive (at 510) an invoice (or other type of payment request). Such an invoice may be retrieved from a terminal such as terminal 120 described above. The invoice may include information such as a listing of goods and/or services, quantities, sales amount, tax amount, etc. The invoice may be generated based on various relevant factors or criteria. For instance, a merchant may scan physical items at a register and begin payment processing. As another example, a user may input a desired selection at a vending machine (or a duration for a parking meter) that may trigger generation of an invoice or payment request. As still another example, a merchant or other provider may enter a total amount into a credit card terminal.

Next, the process may send (at 520) the invoice to a user device such as user device 130 described above. The invoice may be sent across a channel generated by a process similar to process 300 described above.

The process may then receive (at 530) payment information from the user device. Such information may be received via the channel described above. The payment information may be sent based on some input received from a user (e.g., by pressing a "confirmation" button or other user interface element) or may be sent automatically based on proximity. Such payments may be sent based on various user preferences. For instance, a user may authorize a merchant, device, etc. and then payment information may be sent in reply to any validated request (e.g., a user may regularly make purchases from a vending machine and may pre-authorize such purchases up to a specified limit). As another example, the user may be presented with purchase information (e.g., merchant identity, total amount, etc.) and may be required to confirm or otherwise validate the purchase (e.g., by selecting or authorizing a payment method, by tapping or touching the user device to the terminal or other resource, etc.).

Next, the process may send (at 540) a verification request to a server such as server 140 described above. The verification request may include, for instance, total amount requested, payment information received from the user device, etc. In some embodiments, the verification request may be process locally at the terminal (e.g., for store rewards programs, gift cards, etc.).

Next, the process may determine (at 550) whether the verification request has been authorized. Such a determination may be made based on information received from the server in response to the verification request. In some cases, the verification request may be a pre-authorization or other such transaction that is not associated with a final sales amount. In such cases, the verification response may include an approval limit and/or other appropriate information.

If the process determines (at 550) that the verification request should be authorized, the process may then approve (at 560) the purchase and/or otherwise indicate that the verification request has been approved. Such approval may include, for instance, sending one or more messages to the terminal of some embodiments, sending messages to a merchant device, etc. The approval may include a transaction identifier, timestamp, and/or other appropriate information.

Next, the process may send (at 570) confirmation to the user device and then may end. Such confirmation may include, for instance, one or more messages that deliver a receipt or other appropriate information related to the transaction or interaction. The confirmation may also be communicated to the terminal of some embodiments.

If the process determines (at 550) that the verification request should not be authorized, the process may send (at 580) a rejection to the user device and then may end. Such a rejection may also be communicated to the terminal of some embodiments.

One of ordinary skill in the art will recognize that processes 300 and 500 and messaging algorithm 400 may be implemented in various different ways without departing from the scope of the disclosure. For instance, different embodiments may perform the operations in a different order, may include additional operations, may omit listed operations, etc. In addition, various operations may be performed iteratively and/or based on various criteria.

III. Computer System

Many of the processes and modules described above may be implemented as software processes that are specified as one or more sets of instructions recorded on a non-transitory storage medium. When these instructions are executed by one or more computational element(s) (e.g., microprocessors, microcontrollers, digital signal processors (DSPs), application-specific integrated circuits (ASICs), field programmable gate arrays (FPGAs), etc.) the instructions cause the computational element(s) to perform actions specified in the instructions.

In some embodiments, various processes and modules described above may be implemented completely using electronic circuitry that may include various sets of devices or elements (e.g., sensors, logic gates, analog to digital converters, digital to analog converters, comparators, etc.). Such circuitry may be able to perform functions and/or features that may be associated with various software elements described throughout.

Figure 6:
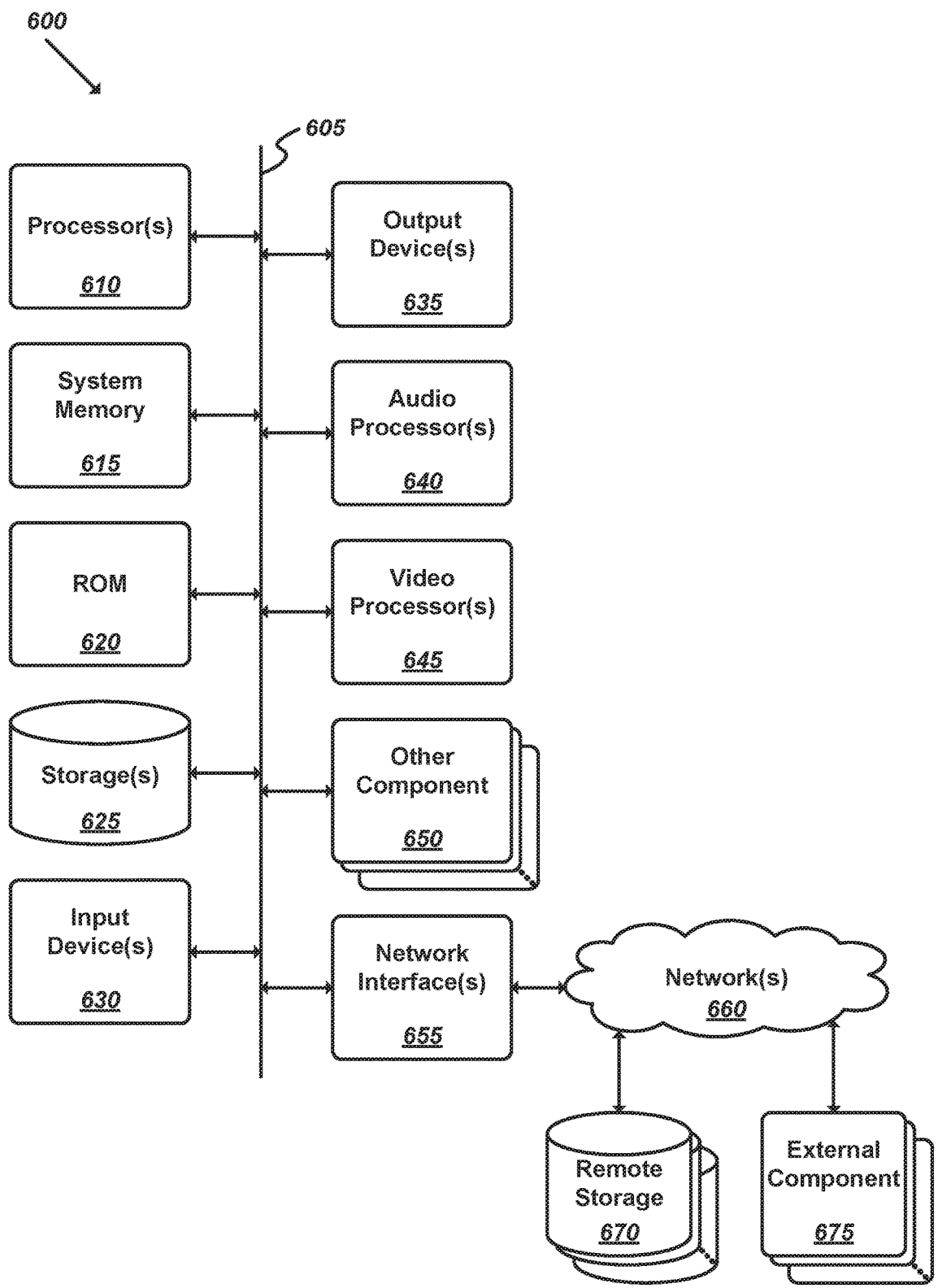
FIG. 6 illustrates a schematic block diagram of an exemplary computer system used to implement some embodiments.

FIG. 6 illustrates a schematic block diagram of an exemplary computer system 600 used to implement some embodiments. For example, the system described above in reference to FIG. 1 or devices described above in reference to FIG. 1, FIG. 2A, or FIG. 2B may be at least partially implemented using computer system 600. As another example, the processes and algorithms described in reference to FIG. 3, FIG. 4, and FIG. 5 may be at least partially implemented using sets of instructions that are executed using computer system 600.

Computer system 600 may be implemented using various appropriate devices. For instance, the computer system may be implemented using one or more personal computers (PCs), servers, mobile devices (e.g., a smartphone), tablet devices, and/or any other appropriate devices. The various devices may work alone (e.g., the computer system may be implemented as a single PC) or in conjunction (e.g., some components of the computer system may be provided by a mobile device while other components are provided by a tablet device).

As shown, computer system 600 may include at least one communication bus 605, one or more processors 610, a system memory 615, a read-only memory (ROM) 620, permanent storage devices 625, input devices 630, output devices 635, audio processors 640, video processors 645, various other components 650, and one or more network interfaces 655.

Bus 605 represents all communication pathways among the elements of computer system 600. Such pathways may include wired, wireless, optical, and/or other appropriate communication pathways. For example, input devices 630 and/or output devices 635 may be coupled to the system 600 using a wireless connection protocol or system.

The processor 610 may, in order to execute the processes of some embodiments, retrieve instructions to execute and/or data to process from components such as system memory 615, ROM 620, and permanent storage device 625. Such instructions and data may be passed over bus 605.

System memory 615 may be a volatile read-and-write memory, such as a random access memory (RAM). The system memory may store some of the instructions and data that the processor uses at runtime. The sets of instructions and/or data used to implement some embodiments may be stored in the system memory 615, the permanent storage device 625, and/or the read-only memory 620. ROM 620 may store static data and instructions that may be used by processor 610 and/or other elements of the computer system.

Permanent storage device 625 may be a read-and-write memory device. The permanent storage device may be a non-volatile memory unit that stores instructions and data even when computer system 600 is off or unpowered. Computer system 600 may use a removable storage device and/or a remote storage device as the permanent storage device.

Input devices 630 may enable a user to communicate information to the computer system and/or manipulate various operations of the system. The input devices may include keyboards, cursor control devices, audio input devices and/or video input devices. Output devices 635 may include printers, displays, audio devices, etc. Some or all of the input and/or output devices may be wirelessly or optically connected to the computer system 600.

Audio processor 640 may process and/or generate audio data and/or instructions. The audio processor may be able to receive audio data from an input device 630 such as a microphone. The audio processor 640 may be able to provide audio data to output devices 640 such as a set of speakers. The audio data may include digital information and/or analog signals. The audio processor 640 may be able to analyze and/or otherwise evaluate audio data (e.g., by determining qualities such as signal to noise ratio, dynamic range, etc.). In addition, the audio processor may perform various audio processing functions (e.g., equalization, compression, etc.).

The video processor 645 (or graphics processing unit) may process and/or generate video data and/or instructions. The video processor may be able to receive video data from an input device 630 such as a camera. The video processor 645 may be able to provide video data to an output device 640 such as a display. The video data may include digital information and/or analog signals. The video processor 645 may be able to analyze and/or otherwise evaluate video data (e.g., by determining qualities such as resolution, frame rate, etc.). In addition, the video processor may perform various video processing functions (e.g., contrast adjustment or normalization, color adjustment, etc.). Furthermore, the video processor may be able to render graphic elements and/or video.

Other components 650 may perform various other functions including providing storage, interfacing with external systems or components, etc.

Finally, as shown in FIG. 6, computer system 600 may include one or more network interfaces 655 that are able to connect to one or more networks 660. For example, computer system 600 may be coupled to a web server on the Internet such that a web browser executing on computer system 600 may interact with the web server as a user interacts with an interface that operates in the web browser. Computer system 600 may be able to access one or more remote storages 670 and one or more external components 675 through the network interface 655 and network 660. The network interface(s) 655 may include one or more application programming interfaces (APIs) that may allow the computer system 600 to access remote systems and/or storages and also may allow remote systems and/or storages to access computer system 600 (or elements thereof).

As used in this specification and any claims of this application, the terms "computer", "server", "processor", and "memory" all refer to electronic devices. These terms exclude people or groups of people. As used in this specification and any claims of this application, the term "non-transitory storage medium" is entirely restricted to tangible, physical objects that store information in a form that is readable by electronic devices. These terms exclude any wireless or other ephemeral signals.

It should be recognized by one of ordinary skill in the art that any or all of the components of computer system 600 may be used in conjunction with some embodiments. Moreover, one of ordinary skill in the art will appreciate that many other system configurations may also be used in conjunction with some embodiments or components of some embodiments.

In addition, while the examples shown may illustrate many individual modules as separate elements, one of ordinary skill in the art would recognize that these modules may be combined into a single functional block or element. One of ordinary skill in the art would also recognize that a single module may be divided into multiple modules.

The foregoing relates to illustrative details of exemplary embodiments and modifications may be made without departing from the scope of the disclosure as defined by the following claims.

I claim:

1. An insertable consumer interaction module comprising:
    a terminal interface able to interact with a sales terminal, the terminal interface comprising a terminal connector including a subscriber identity module (SIM) connector, a secure access module (SAM) connector, or a microSD card connector;
    a communication module comprising:
        at least one antenna able to interact with a user device;
        a transmitter associated with the at least one antenna; and
        a receiver associated with the at least one antenna; and
    a housing that accommodates the terminal interface and the communication module, wherein at least a portion of the housing has a complementary shape to a receptacle of the sales terminal, wherein the receptacle comprises a complementary terminal connector that includes a complementary SIM connector, a complementary SAM connector, or a complementary microSD card connector.

2. The insertable consumer interaction module of claim 1, wherein the communication module communicates across at least one of a Wi-Fi channel and a Bluetooth link.

3. The insertable consumer interaction module of claim 1, wherein the communication module interacts with at least one server.

4. The insertable consumer interaction module of claim 3, wherein the insertable consumer interaction module receives an invoice from the sales terminal via the terminal interface and sends a payment request to the user device via the at least one antenna.

5. The insertable consumer interaction module of claim 4, wherein the insertable consumer interaction module receives payment information from the user device via the at least one antenna, sends a validation request to the server via the at least one antenna, and receives an authorization message from the server via the at least one antenna.

6. The insertable consumer interaction module of claim 1, wherein the terminal connector comprises electrically conductive terminal or pad connections that are communicatively coupled to complementary electrically conductive terminal or pad connections of the complementary terminal connector of the sales terminal.

7. The insertable consumer interaction module of claim 1 further comprising a memory that stores information related to transactions associated with the sales terminal.

8. The insertable consumer interaction module of claim 1, wherein the communication module communicates across at least one of a Wi-Fi channel or a Bluetooth link.

9. The insertable consumer interaction module of claim 1 further comprising a network interface, wherein the network interface communicates with at least one of a Wi-Fi network or a cellular network via the at least one antenna.

10. The insertable consumer interaction module of claim 1, wherein the communication module communicates with a consumer user device via the at least one antenna.

11. The insertable consumer interaction module of claim 10 further comprising a processor that executes sets of instructions that, when executed by the processor, cause the insertable consumer interaction module to:
    retrieve an invoice from the sales terminal;
    send the invoice to the consumer user device;
    receive payment from the consumer user device;

send a verification request to a payment processing server;
receive a payment verification from the payment processing server; and
send an approval message to the sales terminal.

* * * * *